United States Patent
Falk et al.

(10) Patent No.: US 12,108,253 B2
(45) Date of Patent: Oct. 1, 2024

(54) PROTECTED RESETTING OF AN IOT DEVICE

(71) Applicant: Siemens Energy Global GmbH & Co. KG, Munich (DE)

(72) Inventors: Rainer Falk, Poing (DE); Felix Nagel, Nuremberg (DE); Christian Winter, Rednitzhembach (DE)

(73) Assignee: Siemens Energy Global GmH & Co. KG, Munich (DE)

( * ) Notice: Subject to any disclaimer, the term of this patent is extended or adjusted under 35 U.S.C. 154(b) by 129 days.

(21) Appl. No.: 17/778,507

(22) PCT Filed: Oct. 26, 2020

(86) PCT No.: PCT/EP2020/079992
§ 371 (c)(1),
(2) Date: May 20, 2022

(87) PCT Pub. No.: WO2021/099063
PCT Pub. Date: May 27, 2021

(65) Prior Publication Data
US 2022/0417749 A1    Dec. 29, 2022

(30) Foreign Application Priority Data
Nov. 20, 2019 (EP) .................................. 19210364

(51) Int. Cl.
*H04W 12/08* (2021.01)
*G06F 21/31* (2013.01)
(Continued)

(52) U.S. Cl.
CPC ............ *H04W 12/08* (2013.01); *G06F 21/31* (2013.01); *G06F 21/45* (2013.01); *H04W 12/06* (2013.01)

(58) Field of Classification Search
CPC .... H04L 63/123; H04W 12/08; H04W 12/06; G06F 21/45; G06F 21/31
See application file for complete search history.

(56) References Cited

U.S. PATENT DOCUMENTS 10,454,900 B2 * 10/2019 Proulx .................. H04L 9/0863
10,902,418 B2 *  1/2021 Kaja ..................... H04L 63/083
(Continued)

FOREIGN PATENT DOCUMENTS

CN        108986278 A     12/2018

OTHER PUBLICATIONS

B. Chatterjee, N. Cao, A. Raychowdhury and S. Sen, "Context-Aware Intelligence in Resource-Constrained IoT Nodes: Opportunities and Challenges," in IEEE Design & Test, vol. 36, No. 2, pp. 7-40, Apr. 2019. (Year: 2019).*

(Continued)

*Primary Examiner* — Kari L Schmidt
(74) *Attorney, Agent, or Firm* — Laurence A. Greenberg; Werner H. Stemer; Ralph E. Locher

(57) ABSTRACT

A method reconfigures an IoT device which is connectable to a cloud backend. The method includes: storing an access code that is input locally in the cloud backend and storing the access code or check information formed on the basis thereof on the IoT device. The method further includes reconfiguring the IoT device, requesting the access code from the cloud backend, inputting the requested access code on a local configuration interface of the IoT device or on an input device connected to the local configuration interface of the IoT device, and comparing the input access code against the access code stored on the IoT device, or the check information formed on the basis thereof. The IoT device is enabled for reconfiguration upon a positive comparison of (Continued)

the input access code against the access code stored, or the check information formed on the basis thereof.

11 Claims, 2 Drawing Sheets

(51) Int. Cl.
*G06F 21/45* (2013.01)
*H04W 12/06* (2021.01)

(56) References Cited

U.S. PATENT DOCUMENTS

| | | | |
|---|---|---|---|
| 2007/0250914 A1* | 10/2007 | Fazal | G06F 21/31 726/5 |
| 2011/0078549 A1* | 3/2011 | Thueringer | H04L 9/3271 713/168 |
| 2012/0191596 A1* | 7/2012 | Kremen | G06Q 40/02 705/38 |
| 2014/0165171 A1* | 6/2014 | Meng | G06F 21/31 726/7 |
| 2016/0125182 A1* | 5/2016 | Miura | G06F 21/46 726/18 |
| 2016/0127402 A1* | 5/2016 | Veeramachaneni | H04L 63/20 726/23 |
| 2016/0352702 A1 | 12/2016 | Gallant et al. | |
| 2016/0359863 A1* | 12/2016 | Krstic | G06F 12/1408 |
| 2017/0093805 A1* | 3/2017 | Proulx | H04L 63/0876 |
| 2017/0201382 A1* | 7/2017 | Lindteigen | H04L 63/0823 |
| 2017/0201519 A1* | 7/2017 | Yang | H04W 12/08 |
| 2017/0337051 A1* | 11/2017 | Bertani | H04L 61/5046 |
| 2018/0077156 A1* | 3/2018 | Ellingson | H04L 9/14 |
| 2018/0091506 A1* | 3/2018 | Chow | H04L 67/567 |
| 2018/0115551 A1* | 4/2018 | Cole | H04L 47/783 |
| 2018/0183832 A1* | 6/2018 | Chang | H04L 63/08 |
| 2019/0311143 A1* | 10/2019 | Arambillet Echevarría | H04L 63/102 |
| 2019/0394027 A1* | 12/2019 | Falk | G06F 21/577 |
| 2020/0033280 A1* | 1/2020 | Kim | G08C 17/02 |
| 2020/0073452 A1* | 3/2020 | Isberg | H04W 4/70 |
| 2020/0125754 A1* | 4/2020 | Waldron | H04L 9/0836 |
| 2020/0159563 A1* | 5/2020 | Luo | G06F 9/45558 |
| 2020/0334674 A1* | 10/2020 | Youngblood | G06Q 20/36 |
| 2020/0384229 A1* | 12/2020 | Lashinsky | G06V 40/16 |
| 2021/0058395 A1* | 2/2021 | Jakobsson | H04L 67/306 |
| 2021/0084040 A1* | 3/2021 | Sakowicz | H04L 63/1425 |
| 2021/0136155 A1* | 5/2021 | Laibson | H04L 9/3263 |
| 2021/0167953 A1* | 6/2021 | Islam | H04L 9/3242 |
| 2021/0385093 A1* | 12/2021 | Shaw | G06F 21/32 |
| 2023/0171248 A1* | 6/2023 | Zhou | G06F 21/30 726/5 |
| 2024/0031442 A1* | 1/2024 | Bentley | H04L 67/141 |
| 2024/0095327 A1* | 3/2024 | Benkreira | G06N 20/00 |

OTHER PUBLICATIONS

Schuster, Roei, Vitaly Shmatikov, and Eran Tromer. "Situational access control in the internet of things." Proceedings of the 2018 ACM SIGSAC Conference on Computer and Communications Security. 2018, pp. 1056-1073. (Year: 2018).*

Yu, Ruozhou, et al. "The fog of things paradigm: Road toward on-demand Internet of Things." IEEE Communications Magazine 56.9 (2018): 48-54. (Year: 2018).*

"Born connected 2.0 Sensformer® advanced—Scale up your digital power transformer", Siemens AG, siemens.com/sensformer, 2019.

* cited by examiner

PROTECTED RESETTING OF AN IOT DEVICE

FIELD AND BACKGROUND OF THE INVENTION

The invention relates to a method for reconfiguring an IoT device. The invention relates in particular to the problem of how to be able to reset (in other words: reconfigure) an IoT device in a protected manner without the device itself having to communicate with a cloud backend via a network for this purpose.

INTRODUCTION

IoT devices record data and transmit them in protected form to a cloud backend. One example of such an IoT device is the product "Sensformer®" from Siemens, which records monitoring data from transformers and sends them to a cloud backend via a cryptographically protected communication connection, generally a TLS protocol, for evaluation.

These IoT devices have to be configured. The configuration may take place remotely via the cloud interface or via a local administration interface (command line interface or Web server). In order to prevent an unauthorized configuration change, it is necessary to authenticate the service access. For this purpose, a password or a comparable access code typically needs to be input on the local administration interface.

If the access code is no longer known, the affected device is no longer able to be configured and used. If the communication with the cloud backend is then also interrupted, for example due to a previous incorrect configuration, the device is unusable and has to be sent in.

There is therefore a need to be able to reset a device access code or the entire device configuration (password reset/factory reset) in order to regain access to the local administration access. This has to take place in a protected manner in order to prevent an impermissible reset.

SUMMARY OF THE INVENTION

The method according to the invention as claimed in claim 1 offers such a method. Advantageous variants and developments are disclosed in the dependent claims, the description and the figures.

The method according to the invention for reconfiguring an IoT device able to be connected to a cloud backend via a network comprises the following steps:
  storing an access code, to be input locally, in the cloud backend,
  storing the access code or check information formed based thereon on the IoT device,
  querying the access code from the cloud backend,
  inputting the queried access code on a local configuration interface of the IoT device or on an input device connected to the local configuration interface of the IoT device,
  comparing the input access code with the access code stored on the IoT device or the check information formed based thereon, and
  authorizing the IoT device to be reconfigured in the event of a positive comparison of the input access code with the access code stored on the IoT device or the check information formed based thereon.

The first two steps in this case necessarily have to be performed before the rest of the steps. They may also be referred to as preparatory steps. The access code or the check information formed based thereon may already be stored on the IoT device in the factory during production of the IoT device. As an alternative, the access code or the check information may also be stored by the client during onboarding, that is to say when the IoT device is commissioned. It is also possible for this to take place automatically and repeatedly, for example daily, weekly or monthly. This has the advantage that new access codes and associated check information are created automatically. Access codes created in the past are thereby no longer able to be used maliciously, even if they should become known to an attacker.

A connection of the IoT device to the cloud backend is advantageously also set up when the IoT device is commissioned.

The following steps, that is to say querying, inputting and comparing the access code, take place when the IoT device specifically needs to be reconfigured, for example because a communication connection between the IoT device and the cloud backend is no longer working.

The access code may generally be for example a random value containing letters, numbers and/or special characters. It may generally also be a bit string or an XML data structure or a JSON data structure.

In a first variant, the access code may be formed (in other words: generated) by the IoT device itself.

As an alternative, the access code may also be formed by the backend.

In a further variant, a first random value is formed by the IoT device and a second random value is formed by the cloud backend. The common access code is then generated on the basis thereof.

In the context of this patent application, the terms "access code" and "device access code" are used synonymously. In the context of this patent application, "IoT device" is also shortened to "device" at some points for improved readability.

In the context of this patent application, an IoT device is generally understood to mean a wired or wirelessly connectable device that generates data and/or implements control commands. An IoT device is sometimes also referred to in the jargon as an "edge device" or "smart edge device".

In one specific embodiment, the IoT device monitors a transformer. The IoT device transmits for example an oil level, temperature, undervoltage winding current and/or the GPS position of the transformer to the cloud.

The cloud backend is understood to be an IT service accessible via a public or private network. A cloud backend is usually accessible via the Internet or a public mobile radio network, for example 3G, LTE, 5G, LoRa, NB-IoT or SigFox. Examples of a cloud backend are Siemens Mind-Sphere, Microsoft Azure, Amazon AWS. The data transmission may take place in a cryptographically protected manner, for example using a TLS protocol (TLS: Transport Layer Security).

The cloud backend stores the access code to be input locally, such that it is able to be provided to an authorized user when necessary. The IoT device may store the access code directly or store check information formed based thereon. The check information enables the IoT device to check the validity of a locally input access code (as known to a person skilled in the art from password checks).

At a later time, the access code to be input locally on the IoT device may thus be queried from the cloud backend by an authorized user. The access code may for example be displayed or provided in the form of a text file. It may be displayed as a graphical element in order to prevent easy copying of the access code using copy and paste.

The access code queried from the cloud backend is advantageously input on a local configuration interface of the IoT device. This may be for example an RS232, USB, SPI or I2C interface. The input is advantageously performed by way of an input device connected to the local configuration interface by a LAN cable. It is also possible for the IoT device to have an operating interface, for example a keypad or a touch-sensitive screen (touch screen) that enables the access code to be input.

The cloud service may furthermore authenticate the accessing user and log which user has received a device access code. This makes it possible to identify the user locally accessing a device, even though the device itself technically supports only a simple device access code. This helps to implement the IEC62443-4.2 requirement for "unique user identification" (requirement CR1.1(1)).

The access code to be input locally may enable different types of access to the IoT device: First of all, direct access to the configuration menu of the IoT device using the access code is conceivable. Second of all, the access code could enable resetting of a local access password. In this case, the access password would have to be reset by the user in order to gain access to the configuration menu. Third of all, it is conceivable for the access code to be able to be used to directly perform a "factory reset", that is to say a reset of all of the device settings to factory settings.

One of the mentioned types of access may be fixedly predefined in the case of an IoT device. However, in one variant, multiple access codes with a different associated action may be prepared and be able to be provided to authorized users via the cloud backend when necessary. A device then performs the corresponding action depending on which access code was input.

A plurality or multiplicity of access codes to be input locally may also be prepared.

An access code is preferably only of limited (in particular one-time) use. After cloud connectivity has been reestablished, a new set of local device access codes is preferably created.

In one variant, the cloud backend provides an access code for the reconfiguration only when the affected device has not logged onto and/or updated its status data with the cloud backend via the network for a certain period of time (for example 1 hour, 1 day, 1 week). This has the advantage that an access code for local administration access to the device is provided, regardless of user authorizations, only when the affected device has no longer been able to connect to the cloud backend for a relatively long time. During regular operation, when the cloud access is working as intended, the reset code, that is to say the access code, on the other hand, cannot be queried. In this case, the device configuration then has to take place via the cloud backend.

It is furthermore possible that functioning cloud communication has to be set up again following local access within a time window (for example 10 minutes, 1 hour, 24 hours). If this does not take place, the device automatically reactivates the secure previous configuration again.

The invention makes it possible for an IoT device (specifically for example a Sensformer® IoT device from Siemens) whose configuration for cloud access is no longer functioning to be able to be put back into service in a protected manner. This also works in particular when the IoT device is no longer able to communicate with the cloud backend (for example because the network configuration for the cloud access has been configured incorrectly).

Furthermore, a local service access password does not necessarily have to be configured manually on the IoT device. As long as the IoT device is functioning as intended, it may be administered (in other words: configured) via the cloud interface. The prepared access code is provided only when access to the cloud is no longer working. This has the advantage that, during normal operation, it is not possible to access the local configuration interface of the IoT device.

BRIEF DESCRIPTION OF THE FIGURES

The invention is explained below by way of example and schematically with reference to two drawings, in which.

DETAILED DESCRIPTION OF THE INVENTION

Figure 1:
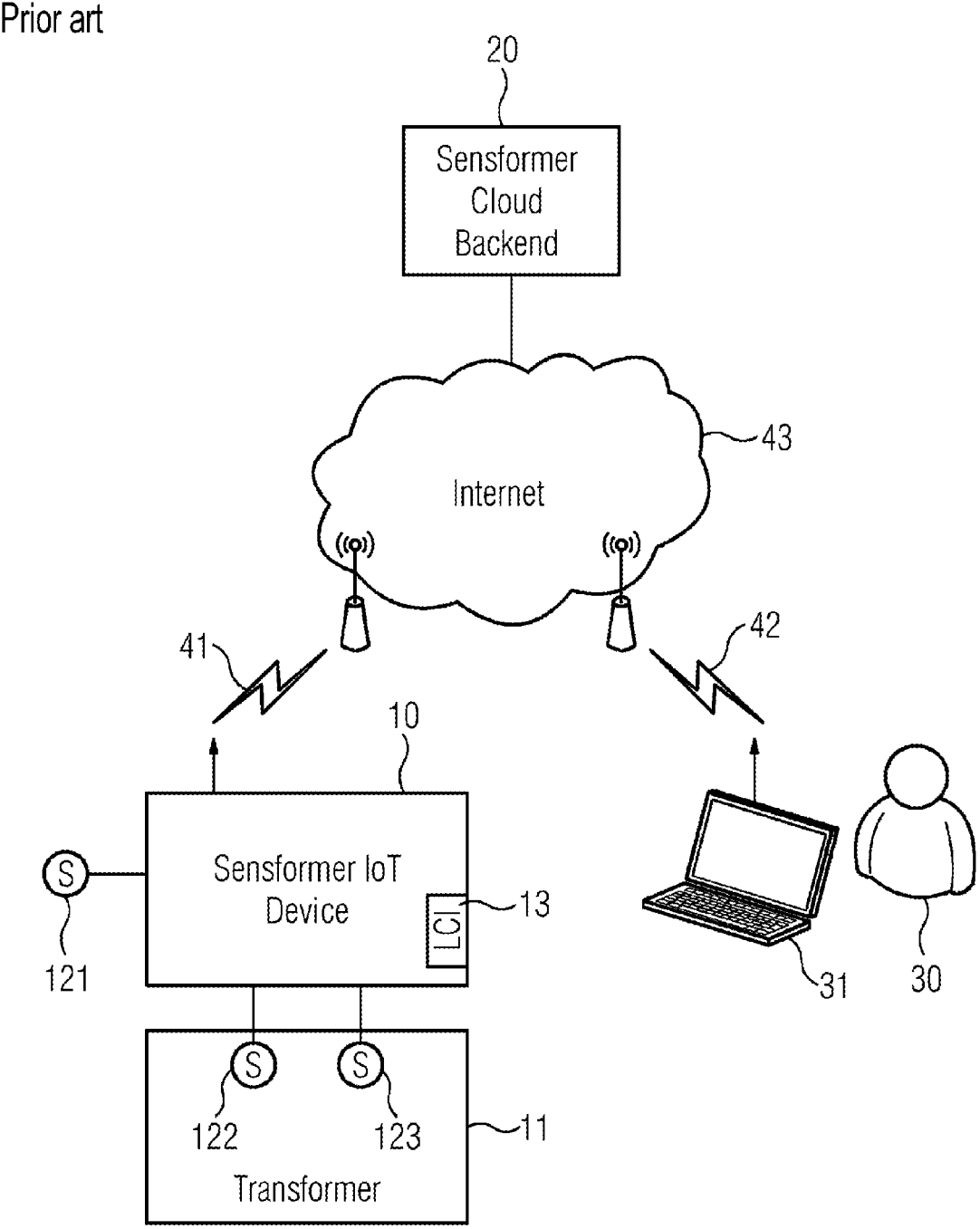
FIG. 1 shows an arrangement of IoT device, cloud backend and user according to the prior art.

FIG. 1 shows an application scenario as to how an IoT device 10 may conventionally be reconfigured in a protected manner. A "Sensformer® IoT device", for short: Sensformer®, from Siemens, is adopted as IoT device 10, for example. The Sensformer® 10 is tasked with monitoring a transformer 11 connected thereto. The Sensformer® 10 uses its own sensor 121 and sensors 122, 123 of the transformer 11 to record monitoring/operating data of the transformer 11 (for example temperature and fill level of the cooling fluid) and the ambient temperature. This information is transmitted to a cloud backend 20 via a mobile radio interface 41 (for example UMTS, LTE, 5G, LoRa, NB-IoT or SigFox) and the Internet 43. It is thereby possible for example to identify if the transformer 11 requires maintenance (predictive maintenance). Firmware is installed on the Sensformer® 10 in order to record and possibly preprocess the sensor data and in order to establish a data transmission connection to the cloud backend 20. Said connection may be achieved using TCP/IP, TLS and HTTP, MQTT, OPC UA or CoAP.

A second connection is also set up in order to manage the Sensformer IoT device 10, that is to say in order to remotely change configuration settings or in order to install a firmware update. A service engineer 30 to this end connects to the configuration interface of the cloud service using an input device 31 and a Web browser and inputs the configuration changes, which are then transmitted to the Sensformer® IoT device 10. The connection between the input device 31, for example a laptop, and the Internet 43 is identified in FIG. 1 by the reference sign 42.

In rare cases, for example in the event of a technical malfunction or in the event of incorrect operation, the case may however occur whereby the installed configuration is not functional. For instance, an incorrect URL of the cloud service, an incorrect certificate of the cloud service, an incorrect device certificate, an incorrect APN name (access point name, a network name for mobile radio access) of the mobile radio configuration or the like may for example lead to the Sensformer® IoT device 10 no longer being able to connect to the cloud backend 20. The configuration is then no longer able to be corrected via the cloud backend 20.

For such cases, provision is therefore made for another local configuration interface (LCI) 13, which may be implemented for example as an RS232, USB, SPI or I2C interface. The service engineer 31 is able to connect to the local configuration interface 13 of the Sensformer® IoT device 10 via a local wired connection. This connection is generally protected by a password or access code known only to the service engineer 30. If he has forgotten it, it is no longer possible to access the IoT device 10 and the IoT device 10 for example has to be sent in for reconfiguration.

The invention then proposes, in such a case, that an access code generated beforehand by the cloud backend and stored on the IoT device has to be input in order to regain access to the configuration settings. In this case, the current configuration settings may automatically be fully or partially reset to default values (for example password reset, factory reset).

Figure 2:
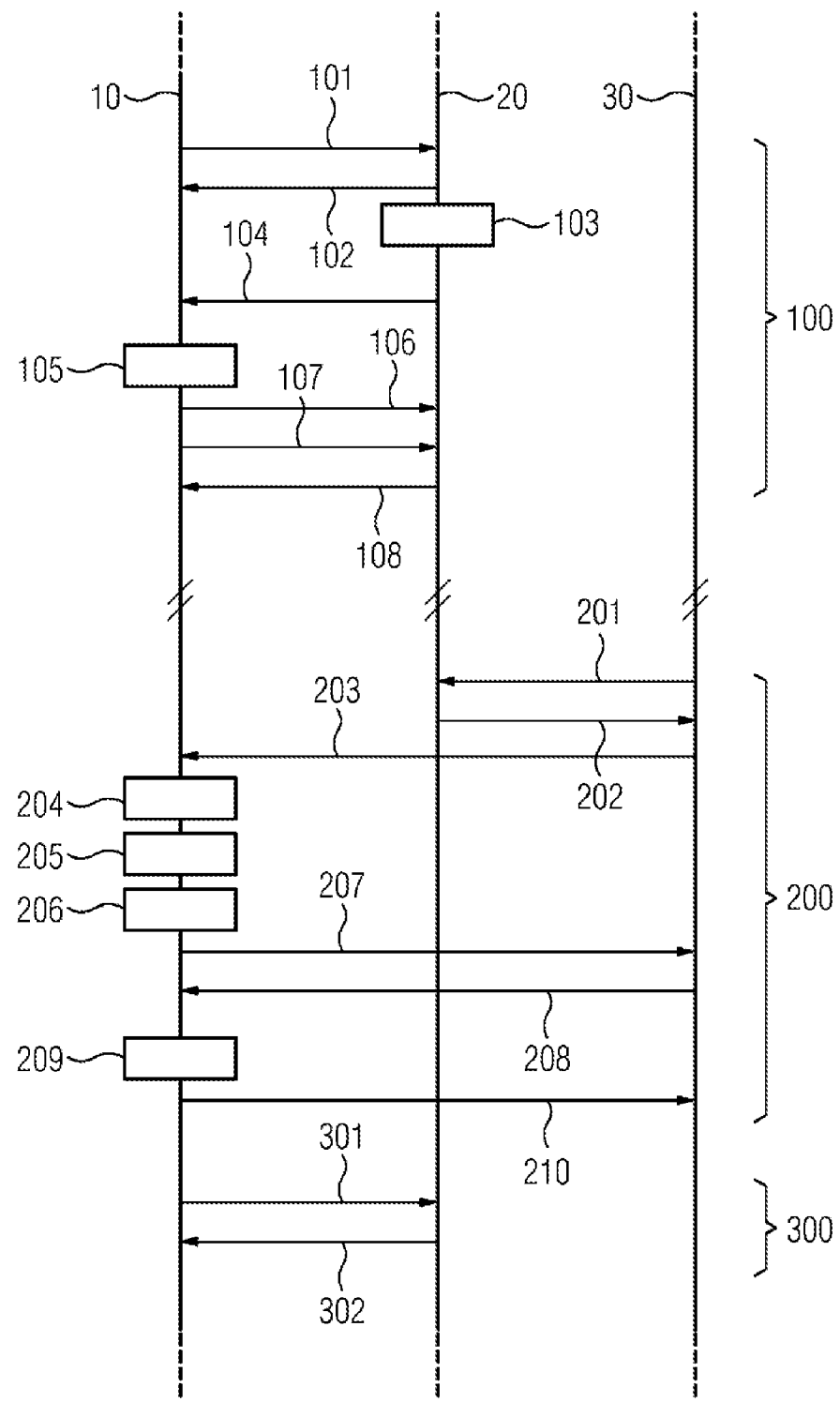
FIG. 2 shows a flowchart of a method for reconfiguring an IoT device according to one embodiment of the invention.

FIG. 2 shows a flowchart of a method for reconfiguring an IoT device 10 according to one embodiment of the invention. This is only an exemplary sequence for which there are a number of alternatives and variants that have obviously already been disclosed to a person skilled in the art in the general description of the invention or that are obvious to him in any case through his expert knowledge.

The reconfiguration method may be divided into two phases: firstly into the phase of generating and storing an access code (phase 100); then into the phase of the actual reconfiguration of the IoT device 10 by way of the local configuration interface 13 (phase 200). If the IoT device 10 has been successfully reconfigured, it is again able to communicate regularly with the cloud backend 20 (phase 300) and for example transmit its sensor data to the cloud backend 20.

In the example of FIG. 2, the first phase 100 comprises the following steps: transmitting a connection signal from the IoT device 10 to the cloud backend 20 (step 101); transmitting a confirmation of receipt of the connection signal from the cloud backend 20 back to the IoT device 10 (step 102). In response thereto, the cloud backend 20 generates an access code to be input locally and stores same in the cloud backend 20 (step 103). The generated access code or check information formed based thereon is then sent from the cloud backend 20 to the IoT device 10 (step 104). This is then stored on the IoT device 10 in the next step 105 (step 105). This is followed by confirmation that the access code or the check information has been stored on the IoT device 10 (step 106) and a signal that the connection between the IoT device 10 and the cloud backend 20 has been interrupted (step 107). Finally, the cloud backend 20 confirms this to the IoT device 10 (step 108).

If there is then an unplanned and unwanted interruption to the connection between the IoT device 10 and the cloud backend 20 and the need arises to reconfigure the IoT device 10, phase 200 comes into force, with the following steps: transmitting a request with respect to the access code from a user 30 to the cloud backend 20 (step 201); the cloud backend 20 answering the user 30 by sending the stored access code (step 202); inputting the received access code on the IoT device 10, for example by way of a laptop connected to the local configuration interface of the IoT device 10 by a LAN connection (step 203). Next, on the IoT device 10, the input access code is compared with the previously stored access code or the associated check information (step 204). If both access codes match or if the check information matches the input access codes, a factory reset takes place in the example illustrated in FIG. 2 (step 205). This makes it possible inter alia for the user 30 to change the configuration settings (step 206). This is communicated to the user 30 (step 207). In the next step, the user 30 reconfigures the IoT device in accordance with his preferences and wishes (step 208). The new configuration settings are stored on the IoT device 10 (step 209) and a confirmation is finally sent to the user 30 (step 210).

The IoT device 10 is then able to be used again to access the cloud backend 20, and so the third phase 300, the regular access of the IoT device 10 to the cloud backend 20, comes into force. This is symbolized in FIG. 2 by transmission of a connection signal from the IoT device 10 to the cloud backend 20 (step 301) and the transmission of a confirmation of receipt from the cloud backend 20 to the IoT device 10 (step 302).

The method illustrated in FIG. 2 thus shows, by way of example, how an IoT device is able to be reconfigured in a protected manner, without the IoT device itself having to communicate with the cloud backend for this purpose (during the reconfiguration).

LIST OF REFERENCE SIGNS

10 IoT device, for example a Sensformer®
11 Transformer
121 Sensor
122 Sensor
123 Sensor
13 Local configuration interface
20 Cloud backend
30 User, service engineer
31 Input device
41 Connection between IoT device and Internet
42 Connection between input device and Internet
43 Internet connection
100 Generation and storage of an access code
101 . . . 108 Steps
200 Reconfiguration of the IoT device via its local configuration interface
201 . . . 210 Steps
300 Regular access of the IoT device to the cloud backend
301, 302 Steps

The invention claimed is:

1. A method for reconfiguring an Internet of things (IoT) device, wherein the IoT device is able to be connected to a cloud backend via a network, which comprises the following steps of:
    forming a first random value by the IoT device;
    forming a second random value by the cloud backend;
    forming an access code based on the first random value and the second random value;
    storing the access code, to be input locally, in the cloud backend;
    storing the access code or check information formed based on the access code on the IoT device, wherein the access code is provided only on a condition that the IoT device has not logged onto the cloud backend via the network for a predetermined period of time;
    querying the access code from the cloud backend;
    inputting the access code queried on a local configuration interface of the IoT device or on an input device connected to the local configuration interface of the IoT device;
    comparing an input access code with the access code stored on the IoT device or check information formed based on the access code; and
    authorizing the IoT device to be reconfigured in an event of a positive comparison of the input access code with the access code stored on the IoT device or the check information formed based on the access code.

2. The method according to claim 1, which further comprises generating the access code by the IoT device or by the cloud backend.

3. The method according to claim 1, wherein the querying of the access code from the cloud backend involves the following substeps:

transmitting a request to the cloud backend; and
providing the access code.

4. The method according to claim 3, wherein the access code is provided by way of displaying the access code, a text file containing the access code or a graphical element depicting the access code.

5. The method according to claim 1, wherein the querying of the access code from the cloud backend involves the further substeps of:

authenticating a querying user; and/or
recording and storing the querying user.

6. The method according to claim 1, wherein the access code queried from the cloud backend is input on the input device that is connected to the local configuration interface of the IoT device by way of a local area network cable.

7. The method according to claim 1, wherein, in the event of the positive comparison of the input access code with the access code stored on the IoT device or the check information formed based on the access code, providing:

a local access password for a local reconfiguration of the IoT device; or
all device settings of the IoT device are reset to factory settings.

8. The method according to claim 1, wherein the access code is able to be used only a limited number of times.

9. The method according to claim 1, which further comprises reversing a reconfiguration if the IoT device has not reconnected to the cloud backend within a predetermined period of time following the reconfiguration.

10. The method according to claim 1, which further comprises monitoring a transformer with the IoT device.

11. The method according to claim 1, wherein the access code is able to be used only once.

* * * * *